United States Patent [19]

Nakayama

[11] 4,144,952
[45] Mar. 20, 1979

[54] SLIDING SUPPORT STRUCTURE FOR A DISC BRAKE CALIPER

[75] Inventor: Tsuneo Nakayama, Iwatsuki, Japan

[73] Assignee: Akebono Brake Industry Co., Ltd., Tokyo, Japan

[21] Appl. No.: 809,767

[22] Filed: Jun. 24, 1977

[30] Foreign Application Priority Data

Jul. 6, 1976 [JP] Japan .................................. 51-89761

[51] Int. Cl.² ............................................. F16D 65/02
[52] U.S. Cl. ...................................... 188/73.3; 308/238
[58] Field of Search ..................... 188/72.4, 73.3, 73.5, 188/73.6, 205 R, 205 A; 308/238

[56] References Cited

U.S. PATENT DOCUMENTS

| 2,324,997 | 7/1943 | Brown | 308/238 |
|---|---|---|---|
| 2,675,283 | 4/1954 | Thomson | 308/238 |
| 2,861,654 | 11/1958 | Dean | 308/238 |
| 3,299,991 | 1/1967 | DeCastelet | 188/205 A |
| 3,375,906 | 4/1968 | Hayes | 188/73.3 |
| 3,682,277 | 8/1972 | Brown | 188/73.3 |
| 4,018,309 | 4/1977 | Mery | 188/72.4 |
| 4,030,577 | 6/1977 | Ogawa et al. | 188/72.4 |

FOREIGN PATENT DOCUMENTS

| 2014468 | 10/1970 | Fed. Rep. of Germany | 188/73.3 |
|---|---|---|---|
| 2414174 | 10/1975 | Fed. Rep. of Germany | 188/73.3 |
| 224019 | 1/1943 | Switzerland | 308/238 |

Primary Examiner—Edward R. Kazenske
Attorney, Agent, or Firm—Toren, McGeady and Stanger

[57] ABSTRACT

A disc brake of a type using pins for guiding a caliper in the axial direction of a rotor. A rigid sleeve having an elastic annular member inserted and secured to the inner circumference thereof is provided at a base portion formed on one side of the caliper or a support; while a guide pin which is secured to the other side of the caliper or support is slidably inserted through the elastic annular member.

3 Claims, 5 Drawing Figures

SLIDING SUPPORT STRUCTURE FOR A DISC BRAKE CALIPER

BACKGROUND OF THE INVENTION

This invention relates to a disc brake of a type using caliper guiding pins which guide a caliper in the axial direction of a rotor.

A principal object of this invention is to provide a disc brake wherein an elastic annular member and a sleeve supporting a slide pin are arranged into one assembly to reduce the sliding resistance of the slide pin and also to facilitate the assembling work on the disc brake with increased precision.

SUMMARY OF THE INVENTION

In accordance with this invention, the caliper guiding pin is inserted into a sleeve with clearance provided between the sleeve and the slide pin; while, inside the sleeve, there is provided an elastic annular member to elastically carry the slide pin. A flange at one end of the sleeve engages with one end of an opening provided in the caliper or a support. The other end of the sleeve is bent back and is arranged to engage with the other end of the opening of the support or caliper in such a way as to secure the sleeve to the support or caliper.

DESCRIPTION OF THE PREFERRED EMBODIMENTS

Figure 1:
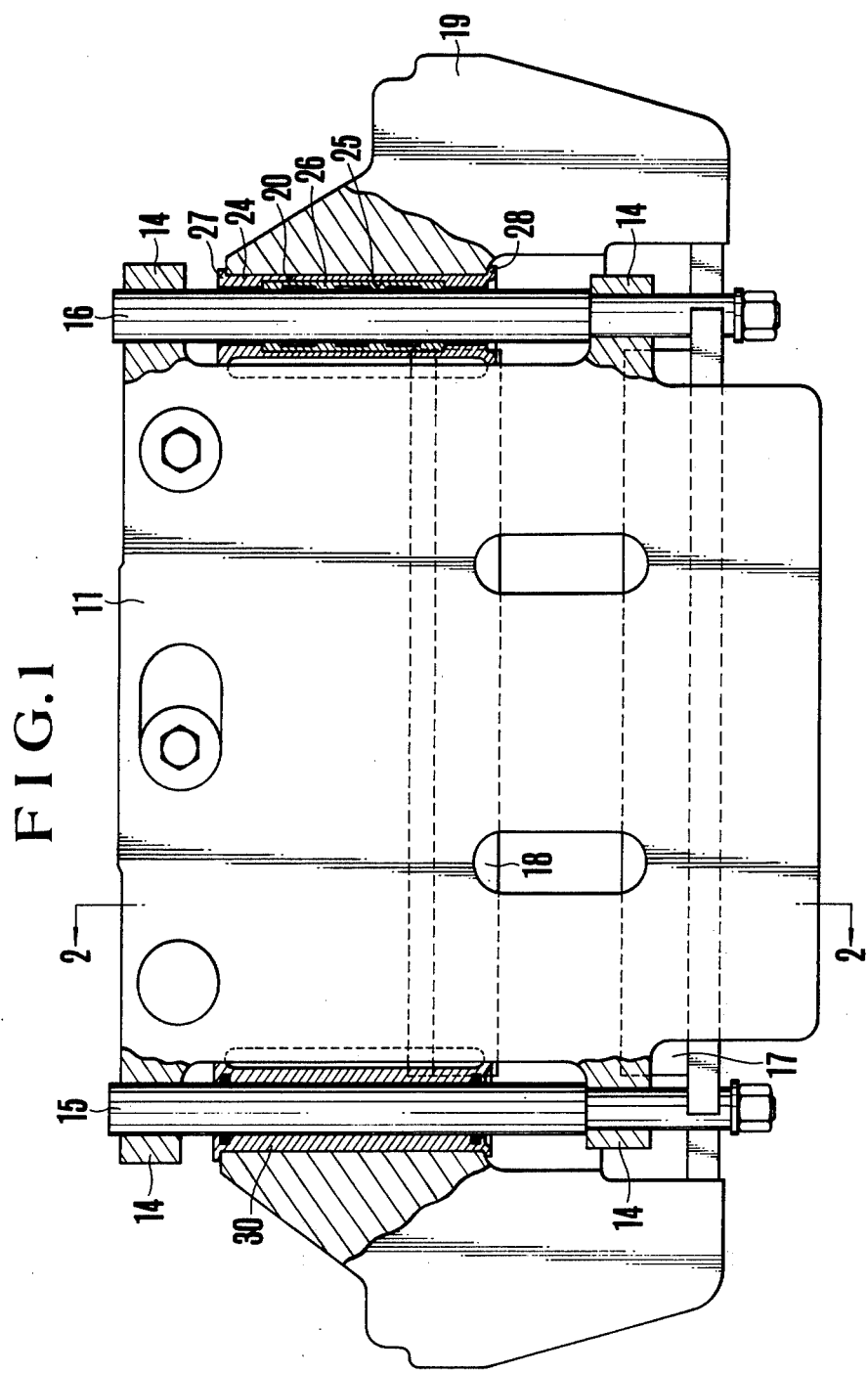
FIG. 1 is a plan view illustrating a disc brake as an embodiment of this invention.
Figure 2:
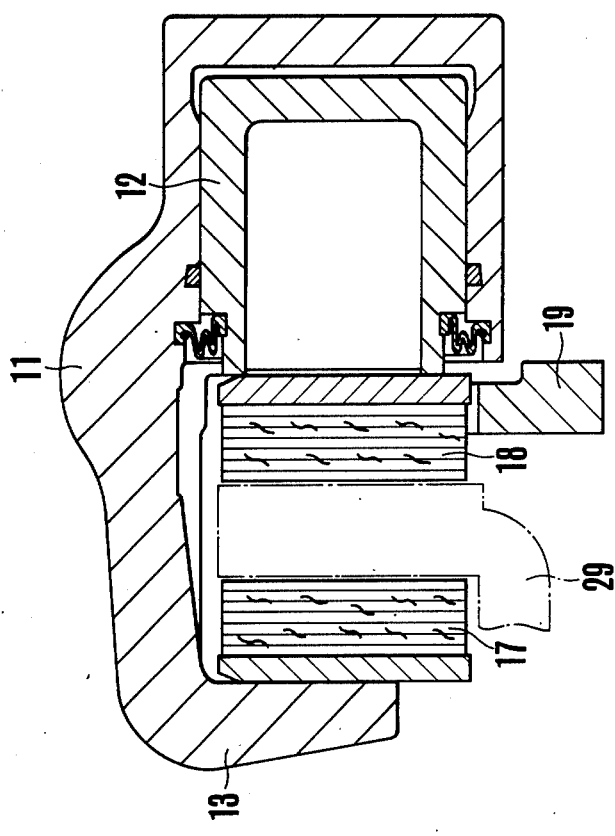
FIG. 2 is a sectional view taken along line 2—2 of FIG. 1, illustrating the disc brake shown therein.
Figure 3:
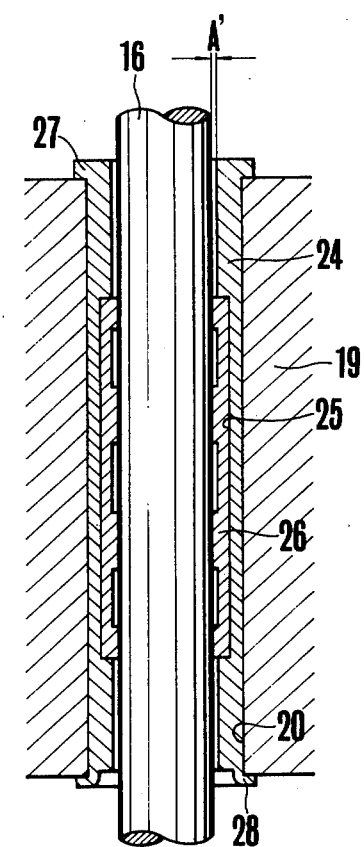
FIG. 3 is an enlarged detail view illustrating a part of the disc brake of FIG. 1.

Referring to the accompanying drawings FIG. 1 through FIG. 3 which illustrate one embodiment of this invention, a caliper 11 which is provided with a piston 12 disposed on one side of a rotor 29 which rotates together with a wheel and a reaction member 13 on the other side of the rotor 29. A pair of pins are connected to lugs 14 provided on both sides of the caliper. An outer friction pad 17 is carried by the pins 15 and 16, while an inner friction pad 18 is carried by an unillustrated guide groove provided in a support 19. Both outer and inner friction pads are thus guided in the axial direction of the rotor 29. The pin 15 is arranged to slide through the inside of a metal sleeve 30 secured to the support 19.

Figure 4:
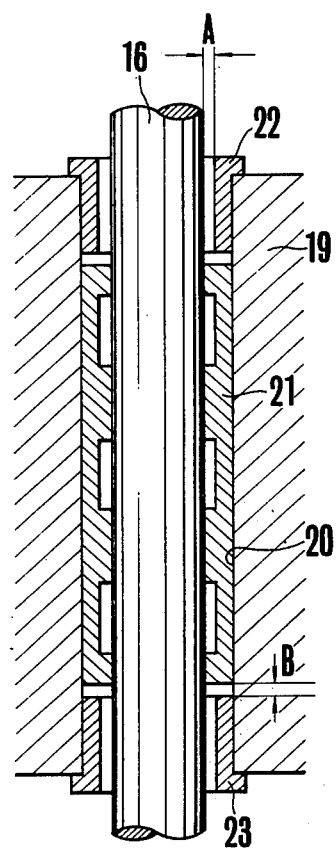
FIG. 4 is an enlarged detail view illustrating a part of a conventional disc brake.

As for the sliding arrangement for the other pin 16, a conventional arrangement which has been employed in general is shown in FIG. 4, in which an elastic annular member 21 is inserted in between an opening 20 of the support 19 and the pin 16 for the purpose of preventing undesired play; while plugs 22 and 23 are pushed into both ends of the opening 20 to prevent the elastic annular member 21 from coming off the inserted position.

Such a conventional arrangement tends to result in decentering of the plugs 22 and 23 or causes them to tilt after they are pushed into their positions and secured thereto. To avoid this, it has been necessary to fit the plugs 22 and 23 in the support 19 with a relatively large clearance A left between the pin 16 and each of these plugs. With such a clearance, however, it is hardly possible to prevent muddy water, etc. from entering the part where the elastic annular member 21 is inserted. In addition to this problem, the elastic annular member cannot easily be replaced when its replacement is necessary.

Further, it is hardly possible to keep the plugs 22 and 23 in engagement with both ends of the elastic annular member 21 because of inconsistency incidental to machining and assembling processes. In view of such difficulty, therefore, a gap B has generally been required between the elastic annular member 21 and each of the plugs 22 and 23. Accordingly, such gaps result in a certain mobility of the elastic annular member 21 in relation to the support 19. This makes it hardly possible to obtain a constant sliding resistance, because under a braking operation, sliding friction takes place sometimes between the elastic annular member 21 and the pin 16 and sometimes between the elastic annular member 21 and the support 19. In addition to such a shortcoming, the conventional arrangement tends to allow mud or the like to accumulate in the gap between each of the plugs 22 and 23 and the elastic annular member 21. Accumulation of such mud tends to hasten the production of rust at the opening of the support 19. Then, such rust brings about an adverse effect on the knock back or shake back performance and also tends to quicken deterioration of the elastic annular member 21. Such shortcomings of the conventional arrangement tend to eventually interfere with a smooth sliding movement of the caliper 11.

The present invention is directed to the elimination of such shortcomings of the conventional arrangement. In accordance with this invention, as shown in FIG. 3, a metal sleeve 24 which is open at both ends thereof is inserted through an opening 20 of a support 19 and is secured to the support. A groove 25 is provided in the inner circumference of the metal sleeve 24 to accommodate and secure a cylindrical elastic annular member 26 thereto to elastically carry a guide pin 16. With such arrangement, the adverse effects of imprecise positioning of parts that have hitherto resulted from decentering or tilting of plugs 22 and 23 in the conventional arrangement can be reduced to a great degree. Therefore, the clearance A' required between each of the open end parts of the sleeve 24 and the guide pin 16 can be made to be smaller than the clearance A that has conventionally been required (A > A'). In addition, unlike the elastic annular member 21 of the conventional arrangement, the gaps B are no longer required at both end parts of the elastic annular member 26, i.e. the length of the elastic annular member 26 in the axial direction of the pin 16 is virtually the same as the length of the groove 25. Therefore, the problem of the adverse effects that have been caused by entrance of muddy water or the like can be reduced to a great extent. Further, the variation in sliding resistance can be effectively reduced, because the sliding movement always takes place between the elastic annular member 26 and the guide pin 16.

Further, a flange 27 which is provided at one end of the sleeve 24 engages with one end of the opening 20 of the support 19, while the other end 28 of the sleeve 24 is bent back to engage with the other end of the opening 20. As a result, the sleeve 24 is secured to the support 19; and this arrangement makes control over the inner diameter of the groove portion 25 of the sleeve 24 and that of the opening 20 of the support 19 much easier than the conventional arrangement whereby the plugs 22 and 23 are fixed to the support by pressing them into their positions.

Figure 5:
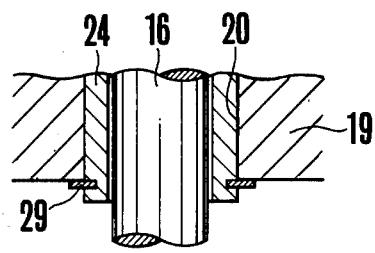
FIG. 5 is an illustration of a further embodiment of this invention.

FIG. 5 illustrates a second embodiment of this invention. Unlike the first embodiment described above, the other end 28 of the sleeve 24 which can be made of either a hard plastic material or metal, is not bent back in this embodiment and, instead of bending the end, the sleeve 24 is secured to the opening 20 by means of a cir-clip 29 which engages with the end part of the sleeve 24.

Further, at the time of braking, even though the support 19 is subjected to brake force generated in the friction pads, the deformation quantity of the elastic member 26 is limited due to the thick metal portion at both ends of the sleeve 24 being closely adjacent to the surface of the guide pin, so that total collapse of the elastic annular member 26 is prevented.

What is claimed is:

1. A disc brake comprising a rotor to which the brake is to be applied, a caliper member having a thrusting means disposed on one side of said rotor and a reaction member disposed on the other side of said rotor, a pair of friction pads each arranged to be pressed against an opposite side of said rotor by said thrusting means and said reaction member, a support member provided for guiding said caliper member in the axial direction of said rotor, a guide pin connected to one of said caliper member and said support member, an axially elongated opening extending through the other one of said caliper member and support member with said guide pin extending axially through said opening and spaced radially inwardly from the surface of said opening, an axially elongated rigid sleeve secured within and extending through said opening with the opposite ends of said sleeve secured to the other of said members so that said sleeve is held against axial displacement within said opening, said sleeve having an axially extending outer surface in contact with the surface of said opening and an inner surface, said sleeve having an axial length at least equal to the axial length of said opening, said sleeve having an annular groove formed in and extending around the inner surface thereof with said groove having a dimension in the axial direction of said opening less than the axial dimension of the opening and with the opposite sides of the groove spaced apart in the axial direction of said opening each being spaced inwardly from the adjacent end of said opening, said sleeve having a thin-walled portion extending for the axial length of said groove and a pair of thick-walled portions each extending from one side of said groove to at least the adjacent end of said opening, the inner surface of said thick-walled portions being spaced closely outwardly from said guide pin, the axially extending inner surface of said groove forming said thin-walled portion being spaced radially outwardly from the inner surface of said thick-walled portions, an elastic annular member disposed in said groove and extending in the radial direction of said opening between the inner surface of said thin-walled portion and the surface of said guide pin for elastically carrying said caliper member, said annular member extending in the axial direction of said opening between the opposite sides of said groove, and the radial dimension of said groove into the inner surface of said sleeve being sufficient to secure said elastic annular member against axial displacement out of said groove with the spacing between the inner surface of said thick-walled portions and said guide pin preventing total collapse of said elastic annular member.

2. A disc brake, as set forth in claim 1, wherein the opposite ends of said sleeve extending radially outwardly from the outer surface of said sleeve within said opening and overlapping and engaging the adjacent surfaces of said member containing said opening for securing said sleeve against axial displacement.

3. A disc brake, as set forth in claim 1, wherein said sleeve is formed of metal.

* * * * *